(12) United States Patent
Katsuki et al.

(10) Patent No.: US 10,108,296 B2
(45) Date of Patent: Oct. 23, 2018

(54) METHOD AND APPARATUS FOR DATA PROCESSING METHOD

(71) Applicant: INTERNATIONAL BUSINESS MACHINES CORPORATION, Armonk, NY (US)

(72) Inventors: Takayuki Katsuki, Tokyo (JP); Tetsuro Morimura, Tokyo (JP); Daisuke Sato, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 136 days.

(21) Appl. No.: 14/849,920

(22) Filed: Sep. 10, 2015

(65) Prior Publication Data

US 2016/0078027 A1    Mar. 17, 2016

(30) Foreign Application Priority Data

Sep. 12, 2014  (JP) .................................. 2014-186308

(51) Int. Cl.
*G06F 3/00* (2006.01)
*G06F 3/041* (2006.01)
(Continued)

(52) U.S. Cl.
CPC .......... *G06F 3/0418* (2013.01); *G06F 3/0488* (2013.01); *G06F 3/04883* (2013.01);
(Continued)

(58) Field of Classification Search
CPC ............. H04L 63/1416; H04L 63/1425; H04L 63/123; G06K 9/46; G06K 2009/00738;
(Continued)

(56) References Cited

U.S. PATENT DOCUMENTS

| | | | |
|---|---|---|---|
| 2010/0172555 A1* | 7/2010 | Hasezawa | G06K 9/00127 382/128 |
| 2011/0060708 A1* | 3/2011 | Suzuki | G06N 99/005 706/12 |

(Continued)

FOREIGN PATENT DOCUMENTS

| | | |
|---|---|---|
| JP | 2000137726 A | 5/2000 |
| JP | 2006072666 A | 3/2006 |

(Continued)

OTHER PUBLICATIONS

Decision to Grant a Patent, Application No. 2014-186308. Apr. 1, 2016. Translated May 3, 2016. 6 pages.

*Primary Examiner* — Mark D Featherstone
*Assistant Examiner* — Diedra McQuitery
(74) *Attorney, Agent, or Firm* — Stosch Sabo (57) ABSTRACT

A method and apparatus for data processing. The present invention provides a data processing apparatus that includes: a series acquisition section for acquiring a data series in which multiple pieces of data are arranged; a fragmentation section for fragmenting the data series to obtain multiple partial data series; a pattern extraction section for extracting multiple patterns of one or more pieces of data appearing in at least one of the multiple partial data series; and a generation section for generating a feature vector having element values, which vary according to whether to include each of the multiple patterns, for each of the multiple partial data series, respectively. There is also provided a method for data processing. The present invention allows for the generation of a feature vector from time-series data indicating a phenomenon the occurrence time of which is temporally irregular to detect features.

1 Claim, 7 Drawing Sheets

(51) Int. Cl.
  *G06F 3/0488* (2013.01)
  *G06F 17/27* (2006.01)
  *G06K 9/62* (2006.01)
  *G06F 17/30* (2006.01)
  *G06K 9/72* (2006.01)

(52) U.S. Cl.
  CPC ........... *G06F 17/27* (2013.01); *G06K 9/6261* (2013.01); *G06K 9/6262* (2013.01); *G06K 9/6269* (2013.01); *G06F 17/30312* (2013.01); *G06K 9/723* (2013.01)

(58) Field of Classification Search
  CPC ........... G06K 9/00087; G06K 9/00765; G06K 9/00785; G06K 9/6215; G06F 17/30371; G06F 17/30604; G06F 21/554; G06F 17/30501; G06F 17/3015
  USPC ................................. 707/687, 690, 693, 737
  See application file for complete search history.

(56) References Cited

U.S. PATENT DOCUMENTS

| | | | | |
|---|---|---|---|---|
| 2011/0153601 A1* | 6/2011 | Nakazawa | ........... | G06F 17/3069 707/723 |
| 2012/0041575 A1* | 2/2012 | Maeda | ................ | G05B 23/024 700/80 |
| 2012/0158629 A1* | 6/2012 | Hinckley | ................ | G06F 3/038 706/15 |
| 2012/0218204 A1* | 8/2012 | Kim | ..................... | G06F 3/0433 345/173 |
| 2012/0221508 A1* | 8/2012 | Chaturvedi | ............. | G06F 17/00 707/602 |
| 2012/0306745 A1* | 12/2012 | Moore | .................... | G06F 3/017 345/158 |
| 2012/0310427 A1* | 12/2012 | Williams | .................. | G05F 1/67 700/287 |
| 2013/0238619 A1* | 9/2013 | Hanaoka | ........... | G06F 17/30551 707/736 |
| 2013/0289904 A1* | 10/2013 | Marwah | .................... | G01D 4/00 702/61 |
| 2014/0078086 A1* | 3/2014 | Bledsoe | .................. | G06F 3/041 345/173 |
| 2014/0222476 A1* | 8/2014 | Romano | .................. | G06Q 30/016 705/7.11 |
| 2014/0282007 A1* | 9/2014 | Fleizach | ............... | G06F 9/4446 715/728 |
| 2015/0039117 A1* | 2/2015 | Park | .................... | G05B 23/0221 700/109 |
| 2015/0164377 A1* | 6/2015 | Nathan | ................. | A61B 5/1122 600/595 |
| 2015/0378795 A1* | 12/2015 | Manoharan | ......... | H04L 41/0631 719/318 |

FOREIGN PATENT DOCUMENTS

| | | |
|---|---|---|
| JP | 2010122748 A | 6/2010 |
| JP | 2010185686 A | 8/2010 |
| JP | 2012079200 A | 4/2012 |
| JP | 2013004087 A | 1/2013 |
| JP | 2014016781 A | 1/2014 |

* cited by examiner

METHOD AND APPARATUS FOR DATA PROCESSING METHOD

CROSS-REFERENCE TO RELATED APPLICATION

This application claims priority under 35 U.S.C. § 119 from Japanese Patent Application No. 2014-186308 filed Sep. 12, 2014, the entire contents of which are incorporated herein by reference.

FIELD OF INVENTION

The present invention relates to a data processing apparatus, a method for data processing, and a program.

BACKGROUND OF THE INVENTION

Conventionally, an operation display device for displaying an image of operating instructions and an information providing device for providing information depending on the skill of a user or the like have been known. Such devices measure the characteristics of the user, such as the user's operation speed and the response time, to determine the skill of the user.

SUMMARY OF THE INVENTION

In such a device, it is desired to estimate the state of the user from input by the user operating the device in order to provide operating instructions, information, and the like according to the estimation result. However, since user's input operation is a phenomenon the occurrence time of which is temporally irregular, no method of analyzing the operation turned into time-series data has not been established. Particularly, it has been difficult to detect the features of user's operation input from time-series data indicative of a phenomenon the occurrence time of which is temporally irregular.

The present invention provides a data processing apparatus that includes: a series acquisition section for acquiring a data series in which multiple pieces of data are arranged; a fragmentation section for fragmenting the data series to obtain multiple partial data series; a pattern extraction section for extracting multiple patterns of one or more pieces of data appearing in at least one of the multiple partial data series; and a generation section for generating a feature vector having element values, which vary according to whether to include each of the multiple patterns, for each of the multiple partial data series, respectively.

The present invention also provides a method for data processing that includes the steps of: acquiring a data series in which plural pieces of data are arranged;

fragmenting the data series to obtain a plurality of partial data series; extracting a plurality of patterns of one or more pieces of data appearing in at least one of the plurality of partial data series; and generating a feature vector having element values, which vary according to whether to include each of the plurality of patterns, for each of the plurality of partial data series.

DETAILED DESCRIPTION OF PREFERRED EMBODIMENTS

Some preferable embodiments will be described in more detail with reference to the accompanying drawings, in which the preferable embodiments of the present invention have been illustrated. However, the present invention can be implemented in various manners, and thus should not be construed to be limited to the embodiments disclosed herein. On the contrary, those embodiments are provided for the thorough and complete understanding of the present invention, and to completely convey the scope of the present invention to those skilled in the art.

Figure 1:
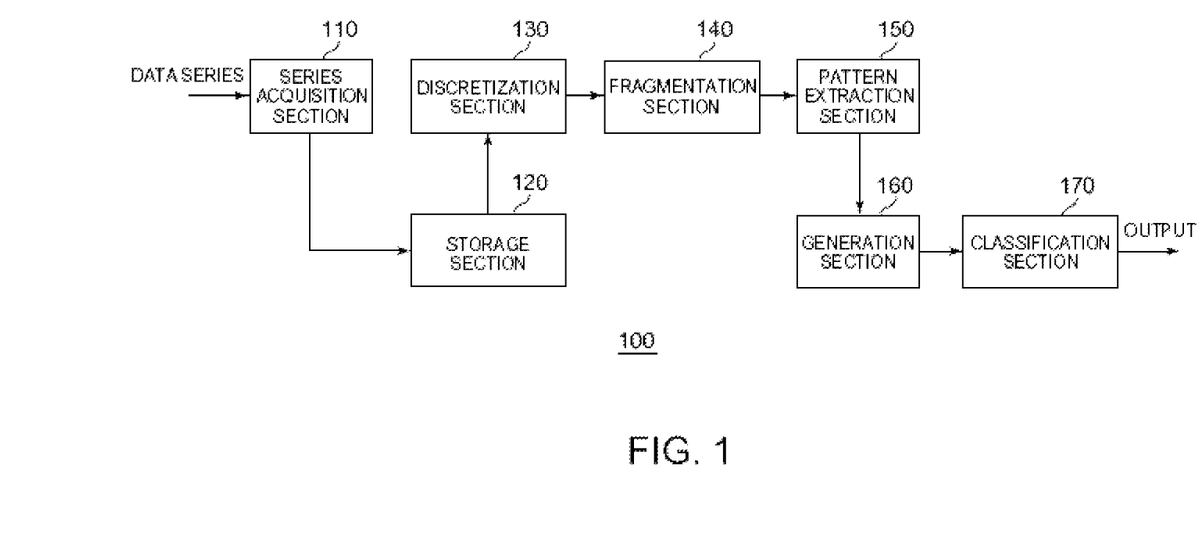
FIG. 1 shows a configuration example of a data processing apparatus 100 according to an embodiment.

FIG. 1 shows a configuration example of data processing apparatus 100 according to an embodiment of the present invention. Data processing apparatus 100 fragments time-series data indicating a phenomenon, the occurrence interval of which is irregular and probabilistic; generates a feature vector according to the presence or absence of a pattern that appears in fragmented partial data series or the number of appearances; and classifies the partial data series according to the feature vector. Data processing apparatus 100 includes: series acquisition section 110, storage section 120, discretization section 130, fragmentation section 140, pattern extraction section 150, generation section 160, and classification section 170.

Series acquisition section 110 acquires a data series with multiple pieces of data arranged. The data series is time-series data obtained by converting input by a user operating a device, such as a mobile terminal, an operation display device, and/or an information providing device, into data in a predetermined multidimensional space. For example, when user's input operation is regarded as an event, multiple pieces of data corresponding to multiple events are arranged in a data series. Among the time-series data, series acquisition section 110 can acquire a classification result corresponding to one or more pieces of data or information on the result to be classified in association with the data.

For example, in the data series the coordinates at which the user touches a touch panel with a finger(s), the contact time, the number of contact fingers, the coordinates before or after the finger(s) is moved while touching the touch panel, the moving distance, the moving time, the time after touching until separating from the touch panel, the time during which no operation is performed, the operation menu that the user selects, and user operations such as tap, double click, swipe, pinch-in, and pinch-out are converted to numeric values, respectively. Then, multidimensional vector data having the numeric values as elements are arranged in time-series order. Series acquisition section 110 acquires a data series in which continuous-valued data including at least one-dimensional continuous values are arranged.

Series acquisition section 110 is connected to an input part of a device operated by the user or the like to acquire a data series. Here, data processing apparatus 100 can be incorporated in the device operated by the user. Alternatively, series acquisition section 110 can read and acquire data series stored in a predetermined format. Further, series acquisition section 110 can be connected to a network or the like to acquire a data series through the network. Series acquisition section 110 supplies the acquired data series to storage section 120 and/or discretization section 130.

Storage section 120 is connected to series acquisition section 110 to store the data series received from series acquisition section 110. Storage section 120 can also store intermediate data in the process of processing the data series by data processing apparatus 100, the computing results, parameters, and the like, respectively. Further, in response to a request from each section in data processing apparatus 100, storage section 120 can supply the stored data to a source of the request. For example, when storage section 120 is connected to series acquisition section 110 to receive a data series from series acquisition section 110, storage section 120 stores the data series. Then, in response to a request from discretization section 130, storage section 120 supplies the stored data series to discretization section 130.

Discretization section 130 discretizes the received data series of continuous-valued data to generate a data series of discrete-valued data. Discretization section 130 compares continuous-valued elements included in the data series with a predetermined threshold value to discretize the continuous-valued elements in order to generate discrete-valued data. Alternatively, discretization section 130 can discretize the data series of continuous-valued data into K clusters using a known algorithm such as K-means. Alternatively, discretization section 130 can further discretize the data series of continuous-valued data using a known discretization method for discretizing time-series data such as SAX (Symbolic Aggregate approXimation). Discretization section 130 supplies the data series of discrete-valued data to fragmentation section 140.

Fragmentation section 140 is connected to discretization section 130 to fragment the received data series of discrete-valued data to obtain multiple partial data series. Fragmentation section 140 fragments the data series of discrete-valued data using a time window having a window width as a predetermined reference time. Alternatively, fragmentation section 140 can fragment the data series of discrete-valued data for each predetermined reference number of data. Here, the predetermined reference time and reference number are configuration parameters set by the user, and the configuration parameters can be stored in storage section 120.

Fragmentation section 140 can also fragment the data series in such a manner that some pieces of data included in a fragmented data series will be included in another fragmented data series. Fragmentation section 140 supplies the fragmented data series to pattern extraction section 150.

Pattern extraction section 150 is connected to fragmentation section 140 to extract multiple patterns of one or more pieces of data appearing in at least one of the received fragmented multiple partial data series. For example, pattern extraction section 150 extracts multiple patterns of data appearing in partial data series larger in number than or equal to the predetermined reference number among the fragmented multiple partial data series. Here, the predetermined reference number is a configuration parameter set by the user. Pattern extraction section 150 supplies the extracted multiple patterns to generation section 160.

Generation section 160 is connected to pattern extraction section 150 to generate a feature vector having element values that vary according to whether the partial data series includes each of the multiple patterns for each of the multiple partial data series. Generation section 160 can generate a feature vector having an element value indicative of the presence or absence of each of the multiple patterns for each of the multiple partial data series, respectively. Alternatively, generation section 160 can generate an element value of the feature vector as an element value representing the number of patterns. Further, generation section 160 can generate a feature vector having an element value indicating whether each of the multiple patterns is included in a predetermined number or more. Generation section 160 supplies the generated feature vector to classification section 170.

Classification section 170 is connected to generation section 160 to classify each of the multiple partial data series based on the received feature vector. When series acquisition section 110 acquires a data series with multiple pieces of data according to multiple events arranged, classification section 170 can estimate whether an abnormal event has occurred in each of the multiple partial data series, respectively.

For example, classification section 170 classifies whether user input corresponding to a partial data series falls within an input operation range assumed in advance. Classification section 170 can also classify whether the user state corresponding to the partial data series is to be provided with the operating instructions, information, and the like. As an example, classification section 170 is a classification model learnable by learning data or the like.

Data processing apparatus 100 according to the embodiment mentioned above generates a feature vector for detecting the feature of user input after acquiring the input by the user operating a mobile terminal or the like as a data series and fragmenting the acquired data series into partial data series. Then, data processing apparatus 100 detects an abnormality in user's input operation according to the feature vector. The detection operation performed by data processing apparatus 100 will be described with reference to FIG. 2.

Figure 2:
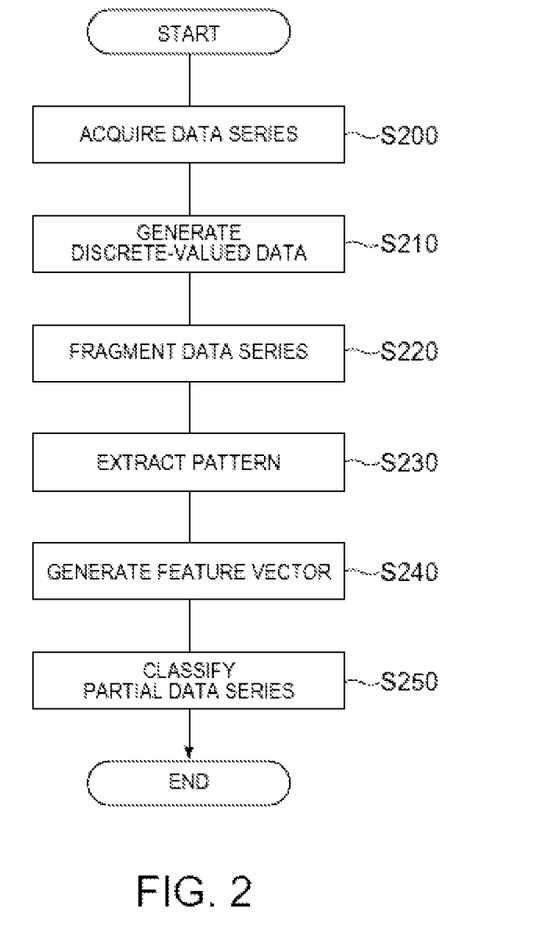
FIG. 2 shows an operation flow of the data processing apparatus 100 according to the embodiment.

FIG. 2 shows an operation flow of data processing apparatus 100 according to an embodiment of the present invention. Data processing apparatus 100 executes the operation flow shown in FIG. 2 to detect an abnormality in user's input operation. The embodiment shown in FIG. 2 is an example where data processing apparatus 100 is mounted in a mobile terminal such as a smartphone to detect an abnormality in user's operation to the mobile terminal.

First, series acquisition section 110 acquires data series S200. Series acquisition section 110 can acquire a data series according to a user's input operation at every predetermined time. Data processing apparatus 100 of the embodiment will be described by taking an example in which series acquisition section 110 acquires a data series shown in FIG. 3.

Figure 3:
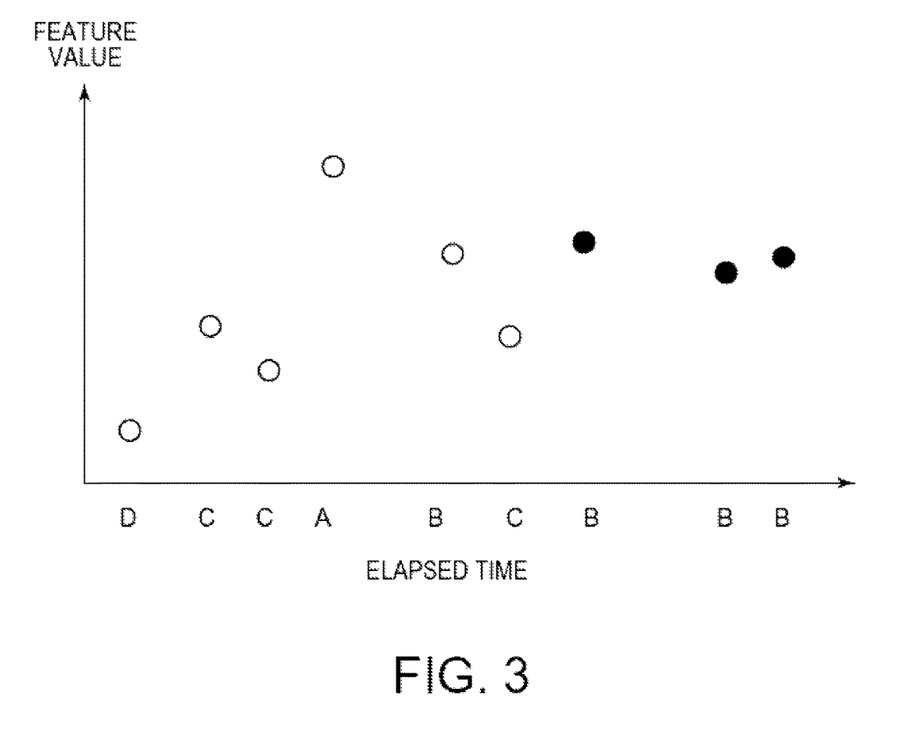
FIG. 3 shows an example of a data series acquired by a series acquisition section 110 according to the embodiment.

FIG. 3 shows an example of the data series acquired by series acquisition section 110 according to the embodiment. In FIG. 3, the abscissa represents the elapsed time and the ordinate represents the value of one element included in data of the data series. In other words, FIG. 3 shows a data series in which data having one element are arranged in time-series order. Although FIG. 3 shows one element for the purpose of showing a schematic structure of the data series, data of the data series has multiple elements. Therefore, the data of the data series becomes a multidimensional vector, but in the description of the embodiment, one of multidimensional elements is shown as an example of data of the data series.

As shown in FIG. 3, series acquisition section 110 acquires a data series in which the intervals of occurrence of data are not temporally constant. The time interval between data becomes irregular because there are few cases where the user's operation input is performed every constant time and the data series includes data according to such operation input. Further, FIG. 3 shows an example where series acquisition section 110 acquires a data series having continuous values. Series acquisition section 110 acquires a data series in which data is arranged in time-series order according to the time during which the user touches the touch panel with a finger(s), the time during which the finger(s) is moved while touching the touch panel, the moving distance, the time after touching until separating from the touch panel, the time during which no operation was performed, and the like.

Figure 4:
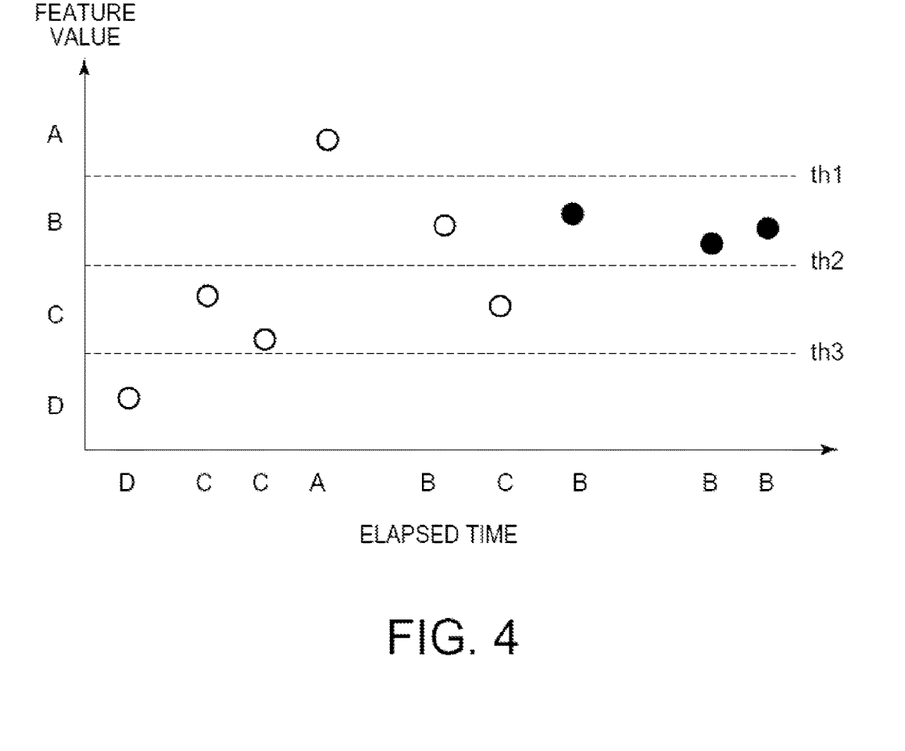
FIG. 4 shows an example of discrete-valued data generated by a discretization section 130 according to the embodiment.

Next, discretization section 130 generates discrete-valued data S210. FIG. 4 shows an example of discrete-valued data generated by discretization section 130 according to the embodiment. In FIG. 4, the abscissa represents the elapsed time and the ordinate represents the value of each element in the data series. Further, discretization section 130 generates discrete-valued data using predetermined threshold values.

For example, discretization section 130 sets data having an element greater than or equal to a threshold value th1 as A. Discretization section 130 also sets data having an element greater than or equal to a threshold value th2 and less than the threshold value th1 as B. Discretization section 130 further sets data having an element greater than or equal to a threshold value th3 and less than the threshold value th2 as C. Further, discretization section 130 sets data having an element less than the threshold value th3 as D. Thus, discretization section 130 generates a data series having discrete values arranged as "DCCABCBBB." Here, the predetermined threshold values can be configuration parameters.

Figure 5:
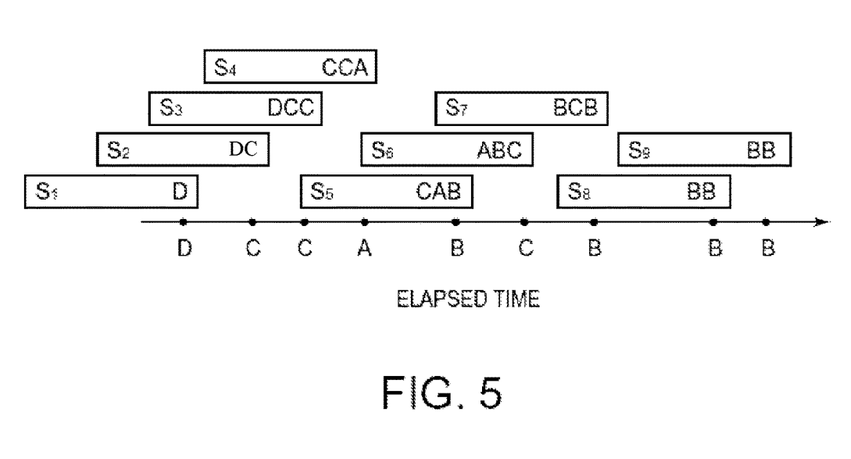
FIG. 5 shows an example of partial data series obtained by fragmenting the data series by means of a fragmentation section 140 according to the embodiment.

Next, fragmentation section 140 fragments data series S220. FIG. 5 shows a partial data series obtained by fragmenting the data series by means of fragmentation section 140 according to the embodiment. In FIG. 5, the abscissa represents the elapsed time. FIG. 5 shows fragmentation section 140 using a time window having a window width as a predetermined reference time to fragment the data series. As an example, fragmentation section 140 sets a data series that includes data that occurs from the time of generating the data or an event before a reference time as a partial data series. In FIG. 5, the reference time is approximately 10 seconds.

Fragmentation section 140 generates partial data series in a user's operational order. Fragmentation section 140 generates partial data series S1 including data D corresponding to the first input operation in response to the fact that there is no operation input during 10 seconds before input D. Next, fragmentation section 140 generates partial data series S2 including data C corresponding to the next input operation and data D in response to the fact that operation input during 10 seconds before input C is input D. Thus, fragmentation section 140 fragments the data series, data by data, in time-series order to generate partial data series S1 to S9.

Next, pattern extraction section 150 extracts patterns of data appearing in partial data series S230. Here, pattern extraction section 150 extracts multiple patterns that appear in partial data series the number of which is larger than or equal to a predetermined reference number among multiple partial data series. For instance, pattern extraction section 150 extracts patterns that appear in partial data series three times or more.

For example, pattern extraction section 150 extracts pattern "D" as a frequently-appearing pattern in response to the fact that pattern "D" appears in partial data series S1, S2, and S3. Similarly, pattern extraction section 150 extracts patterns "A," "B," and "C" as frequently-appearing patterns. On the other hand, pattern extraction section 150 does not extract pattern "CC" as a frequently-appearing pattern because pattern "CC" does not appear in any other partial data series even though it appears in partial data series S3 and S4 twice in total. Thus, pattern extraction section 150 extracts patterns distinctive of user's operations as patterns that appear in partial data series a plurality of times.

Here, pattern extraction section 150 can extract, as at least one pattern, the identified end part of the pattern and at least part of the pattern other than the end part. For example, suppose that pattern extraction section 150 identifies the end part of the pattern as "B" according to data BCB in partial data series S7 and extracts pattern "B" (and pattern "C") from data CB other than the end part of the pattern to regard pattern "BB" (and pattern "BC") as having appeared. In other words, it is assumed that pattern extraction section 150 regards patterns "B," "C," "BC," "CB," "BB," and "BCB" as having appeared with respect to data BCB.

This causes pattern extraction section 150 to extract pattern "BB" as a frequently-appearing pattern in response to the fact that pattern "BB" appears in partial data series S7, S8, and S9. Thus, when the user wants to operate "BB," pattern extraction section 150 does not make a distinction between a result of actually operating "BB" and a result of operating "BCB" due to an error in operation or the like and extracts the patterns as substantially the same operational feature. Even when a distinctive operation is the pattern "BB" because of a user's stumble activity such as confusion, difficulty, failure, or the like in an input operation, pattern extraction section 150 does not make a distinction between a pattern (e.g., "BACB") with other operations input in between and the feature, and regards substantially the same feature as having appeared in like fashion.

As mentioned above, pattern extraction section 150 according to the embodiment extracts five patterns "A," "B," "C," "D," and "BB" including the user's erroneous input as patterns of data appearing three times or more in the partial data series. Note that the extraction of patterns by pattern extraction section 150 can be made in such a manner to successively count the number of appearances of each pattern that appears in the partial data series, respectively, or by using a known algorithm such as PrefixSpan as frequently-appearing pattern mining.

Next, based on the patterns extracted by pattern extraction section 150, generation section 160 generates a feature vector corresponding to each of partial data series S240, respectively. As an example, generation section 160 according to the embodiment makes the number of elements in the feature vector identical to the number of patterns extracted (five in this example). Then, generation section 160 makes the first element correspond to pattern "A." When pattern "A" is included in a partial data series, the first element is set to 1, whereas when it is not included, the first element is set to 0. Similarly, generation section 160 makes the second to fifth elements correspond to patterns "B," "C," "D," and "BB" in turn to determine the values of 1 and 0 of corresponding elements depending on the patterns included in the partial data series.

For example, when partial data series 51 includes pattern "D" and does not include the other patterns "A," "B," "C," and "BB," the generation section 160 generates, as a feature vector φ (S1), a vector [0,0,0,1,0] with the fourth element corresponding to pattern "D" set to 1. Here, φ (x) denotes a feature vector for a partial data series x. Thus, generation section 160 generates feature vectors for respective partial data series as shown in the following equation:

$$\phi(S1)=[0,0,0,1,0]$$

$$\phi(S2)=[0,0,1,1,0]$$

$$\phi(S3)=[0,0,1,1,0]$$

$$\phi(S4)=[1,0,1,0,0]$$

$$\phi(S5)=[1,1,1,0,0]$$

$$\phi(S6)=[1,1,1,0,0]$$

$$\phi(S7)=[0,1,1,0,1]$$

$$\phi(S8)=[0,1,0,0,1]$$

$$\phi(S9)=[0,1,0,0,1] \quad \text{(Math. 1)}$$

Next, classification section 170 classifies each partial data series according to the feature vector generated by generation section 160, respectively. Since generation section 160 generates a feature vector corresponding to each partial data series, classification section 170 can classify the partial data series using an identification method based on a known classification model such as support vector machine (SVM) or logistic regression.

Classification section 170 can set a feature of each classified group as a feature of a partial data series included in the group. In other words, classification section 170 sets, as a feature of the group, a state of the user at the time when the partial data series is input by the user. The feature of the group can be assigned individually by analyzing the classified partial data series. For example, a group of partial data series in which the same operation is repeated in a situation where the same operation does not need to be repeated is set as a situation where user is stumbling.

Further, when series acquisition section 110 acquires a classification result corresponding to one or more pieces of data or information on a result to be classified among time-series data in association with the data, classification section 170 can determine a feature of each classified group based on information on the classification result corresponding to partial data series included in the group. For example, in FIG. 3, series acquisition section 110 acquires time-series data together with information indicating the first six points of the time-series data (open circles of data in FIG. 3) as a normal state where the user is operating well and the next three points (filled circles of data in FIG. 3) as a state where the user is stumbling.

In this case, classification section 170 predetermines a feature of a group having feature vectors (φ(S7), φ(S8), and φ(S9)) including more patterns "B" and "BB," in which data B indicating that the user is stumbling appears, to be the state where the user is stumbling. This enables data processing apparatus 100 to characterize the other partial data series classified in the group as the state where the user is stumbling, and hence to determine the state of the user at the time of operating the partial data series to be stumbling.

Thus, when series acquisition section 110 acquires a classification result corresponding to multiple pieces of data or information on a result to be classified among time-series data in association with the data, data processing apparatus 100 can set configuration parameters by cross-validation. In other words, data processing apparatus 100 generates a feature vector using some of the multiple pieces of data and checks whether each partial data series includes an extracted pattern. From the checking results, data processing apparatus 100 can adjust configuration parameters to be set by the user. Then, data processing apparatus 100 can generate a feature vector using some of the remaining part of the multiple pieces of data and check whether the partial data series includes the extracted pattern to adjust the configuration parameters. This enables data processing apparatus 100 to optimize the classification operation of classification section 170.

As described above, data processing apparatus 100 of the embodiment fragments time-series data and extracts a frequently-appearing pattern that appears in the fragmented partial data series. A feature vector can be generated according to the extracted pattern even if respective pieces of time-series data occur at temporally unequal intervals. This enables data processing apparatus 100 to characterize each of partial data series according to the feature vector. Therefore, data processing apparatus 100 can represent as time-series data a phenomenon, the occurrence time of which is temporally irregular such as user's input operation to estimate a state of the user, and hence to detect an abnormality according to the estimation result, provide operating instructions, provide information, and the like.

Further, data processing apparatus 100 of the embodiment can generate a versatile feature vector capable of being processed by generation section 160 using known identification method and analysis method. Therefore, data processing apparatus 100 can add parameters and the like characterized by another algorithm and another apparatus as elements of the feature vector. Further, data processing apparatus 100 can supply the generated feature vector to another application or the like. In this case, data processing apparatus 100 can function as an apparatus for generating a feature vector and characterizing time-series data without including classification section 170.

Data processing apparatus 100 of the embodiment mentioned above is described as an example where fragmentation section 140 fragments a data series of discrete-valued data to obtain multiple partial data series, and pattern extraction section 150 extracts a pattern from the multiple partial data series. Alternatively, pattern extraction section 150 can extract a pattern from the entire data series of discrete-valued data. For example, pattern extraction section 150 can chronologically trace back to a predetermined time for each point of data to extract an appearing pattern from a data series that occurs during a period of time traced back.

As an example, when the discrete-valued data series in FIG. 4 is input, pattern extraction section 150 first chronologically traces back from data D by a predetermined time. Since there is no operation input before data D, pattern extraction section 150 regards pattern "D" as having appeared. Next, pattern extraction section 150 chronologically traces back from data C by a predetermined time, and regards patterns "C" and "D" as having appeared from a data string CD. Next, pattern extraction section 150 chronologically traces back from data C by a predetermined time, and regards patterns "C," "D," "CC," "CD," and "CCD" as having appeared from a data string CCD. Thus, pattern extraction section 150 can check the appearance of a pattern for each piece of data arranged in time-series order to extract a frequently-appearing pattern according to the appearance of the pattern greater in number of times than or equal to a predetermined reference number.

Further, data processing apparatus 100 of the embodiment mentioned above is described as an example where pattern extraction section 150 extracts a pattern of data appearing in partial data series including user's erroneous input or the like. Alternatively, pattern extraction section 150 can extract a pattern of data without including the user's erroneous input or the like. In other words, for example, pattern extraction section 150 regards a pattern "BB" as not appearing in a data string BCB.

Alternatively, pattern extraction section 150 can determine whether to include the user's erroneous input depending on the application operated by the user. Further, whether to include the user's erroneous input can be a configuration parameter set by the user. In this case, pattern extraction section 150 extracts a pattern of data according to the setting of the configuration parameter.

Figure 6:
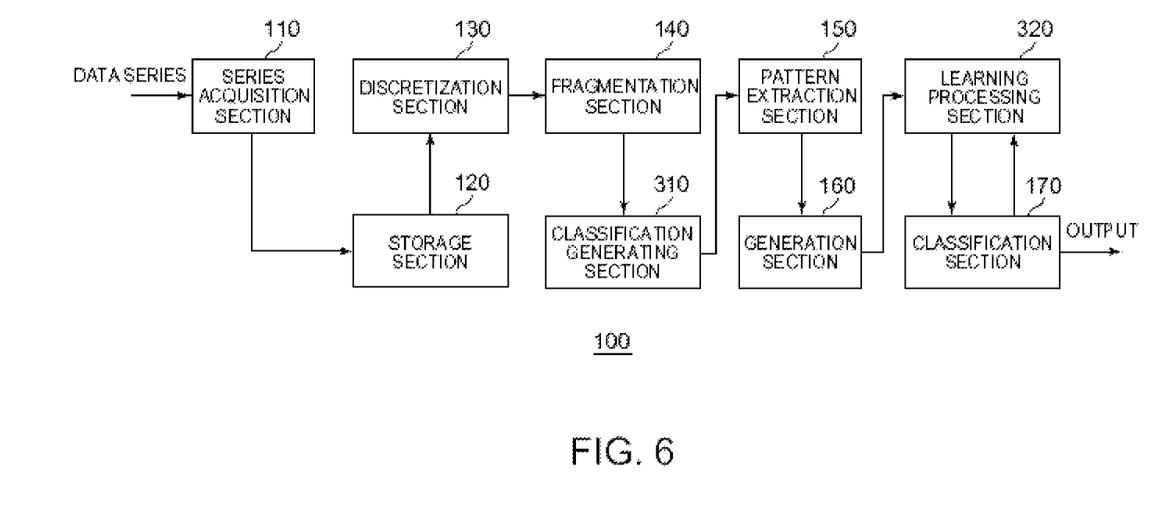
FIG. 6 shows a variation of the data processing apparatus 100 according to the embodiment.

FIG. 6 shows a variation of data processing apparatus 100 according to an embodiment of the present invention. In FIG. 6, data processing apparatus 100 performs substantially the same operations as those of data processing apparatus 100 according to the embodiment shown in FIG. 1. Data processing apparatus 100 of the FIG. 6 generates a feature vector while adding classification results to partial data series to learn classification section 170 using the classification results and the feature vector. Data processing apparatus 100 further includes classification generating section 310 and learning processing section 320.

Classification generating section 310 generates a learning classification result of each of multiple partial data series for learning obtained by fragmenting a learning data series from a classification result added to each data included in the partial data series. In this case, series acquisition section 110 acquires a learning data series in which a classification result is added to each of multiple pieces of data beforehand. Classification generating section 310 is connected to fragmentation section 140 to generate each of classification results of multiple partial data series fragmented by fragmentation section 140, respectively. Classification generating section 310 can generate classification results according to the number of classification results added to each data included in the partial data series.

Here, the operation of classification generating section 310 will be described using the discretized data series (DCCABCBBB) arranged in time-series order shown in FIG. 4. It is assumed that a classification result indicating user's "normal operation input" is added to the first six pieces of data (DCCABC) in the data series, and a classification result indicating user's "stumble in operation input" is added to the next three pieces of data (BBB).

For example, when the classification results of data contained respectively in the partial data series S1 to S6 are all "normal operation input," classification generating section 310 sets the classification result of the partial data series S1 to S6 as "normal operation input." Among the classification results of data contained in the partial data series S7, when two indicate "normal operation input" and one indicates "stumble in operation input," classification generating section 310 sets the classification result of the partial data series S7 as "normal operation input." Further, when the classification results of data contained respectively in the partial data series S8 and S9 are all "stumble in operation input," classification generating section 310 sets the classification results of the partial data series S8 and S9 as "stumble in operation input."

Thus, classification generating section 310 can set a classification result, added beforehand to a larger number of data included in a partial data series, as the classification result of the partial data series. Alternatively or in addition, when a classification result indicating the level of an abnormality higher than or equal to a predetermined reference level is added to each data included in each of multiple partial data series for learning, classification generating section 310 assigns the classification result indicating the abnormality to the partial data series.

As an example, classification generating section 310 sets, as "stumble in operation input," the classification result of a partial data series including two or more data to which the classification result of "stumble in operation input" is added. Even in this case, classification generating section 310 sets the classification result of the partial data series S8 and S9 as "stumble in operation input." Thus, classification generating section 310 can add a classification result to a partial data series more properly.

Learning processing section 320 learns the classification of multiple partial data series using multiple feature vectors for multiple partial data series obtained by fragmenting a learning data series to which classification results are added beforehand. Learning processing section 320 is connected to generation section 160 to acquire, as learning data, feature vectors generated by generation section 160 and classification results of partial data series added by classification generating section 310.

Based on a feature vector for each of multiple partial data series for learning and a learning classification result, learning processing section 320 learns the classification of the multiple partial data series. Learning processing section 320 is connected to classification section 170 to acquire a classification result by classification section 170 according to the feature vector to learn classification section 170. Here, classification section 170 can be a known classification model.

For example, learning processing section 320 divides the acquired learning data series into data series of training data and test data. Learning processing section 320 can divide the data series into training data and test data at a predetermined rate. Then, learning processing section 320 uses the training data to learn classification section 170. Classification section 170 classifies each of the partial data series according to the feature vector generated by generation section 160, respectively. Since the operation of classification section 170 is described with reference to FIG. 2, the description thereof will be omitted here. Classification section 170 supplies the classification result to learning processing section 320.

Learning processing section 320 compares the received classification result with the classification result generated by classification generating section 310 to learn classification section 170 according to the rate of matching between the classification results. As an example, when the rate of matching with the classification result by classification section 310 is lower than a predetermined rate such that classification result by classification section 170 is less than a predetermined accuracy rate, learning processing section 320 changes a parameter for classification section 170 or the like to cause classification section 170 to perform classification using the same training data.

When the classification result by classification section 170 becomes higher than or equal to the predetermined accuracy rate, learning processing section 320 completes the learning using the training data. Then, learning processing section 320 switches from the training data to the test data to predict a classification result of the test data using learned classification section 170. As an example, when the accuracy rate of a prediction result using the test data is higher than or equal to a predetermined value, learning processing section 320 completes the learning of classification section 170. When the classification result by classification section 170 is less than the predetermined accuracy rate, learning processing section 320 can switch from the test data to the training data and change a configuration parameter or the like to perform learning using the training data.

Thus, learning processing section 320 first learns classification section 170 using the training data to make the accuracy rate of the data series higher than or equal to the predetermined value. Then, learning processing section 320 uses learned classification section 170 to predict a classification result of the test data. When the accuracy rate of the prediction result is less than the predetermined value, learning processing section 320 determines that the learning is insufficient, and returns to the learning of the training data. Here, it is preferred that learning processing section 320 should learn classification section 170 using the training data with parameters different from those used in the previous learning of classification section 170 using the training data. Further, learning processing section 320 can change a threshold value for the accuracy rate to learn classification section 170 using the training data.

As mentioned above, since data processing apparatus 100 of the variation evaluates the classification result using learning data to which target data to be a classification result of a partial data series is added beforehand, learning to increase the accuracy rate of the classification result can be achieved.

Figure 7:
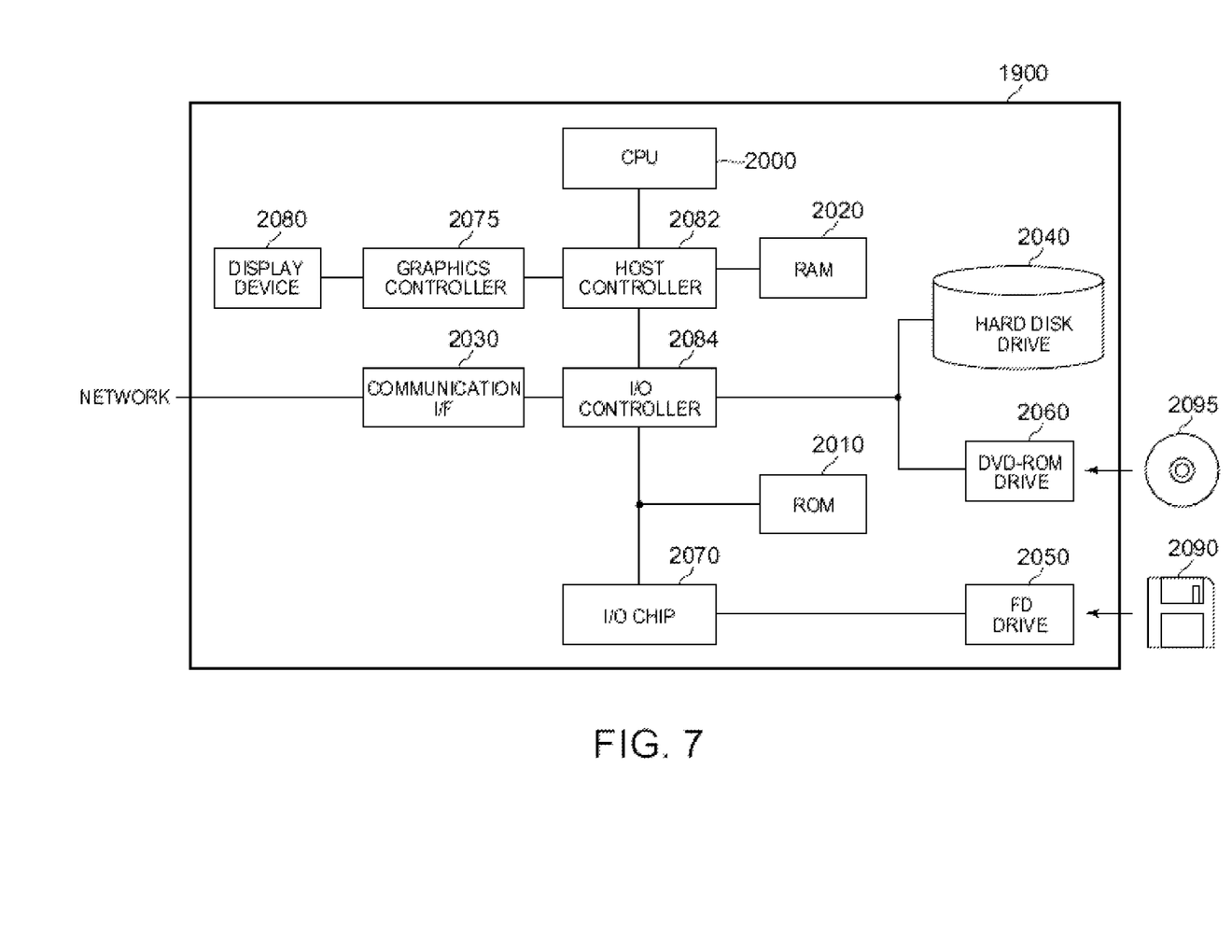
FIG. 7 shows an example of the hardware configuration of a computer 1900 functioning as the data processing apparatus 100 according to the embodiment.

FIG. 7 shows an example of the hardware configuration of computer 1900 functioning as data processing apparatus 100 according to an embodiment of the present invention. Computer 1900 includes: a CPU peripheral section having CPU 2000, RAM 2020, graphics controller 2075, and display device 2080, which are interconnected by host controller 2082; an I/O section having communication interface 2030, hard disk drive 2040, and DVD drive 2060, which are connected to host controller 2082 through I/O controller 2084; and a legacy I/O section having ROM 2010, flexible disk drive 2050, and I/O chip 2070 connected to I/O controller 2084.

Host controller 2082 connects RAM 2020 with CPU 2000 and graphics controller 2075, which access RAM 2020 at a high transfer rate. CPU 2000 operates based on programs stored in ROM 2010 and RAM 2020 to control each section. Graphics controller 2075 acquires image data generated by CPU 2000 or the like on a frame buffer provided in RAM 2020, and displays the image data on display device 2080. Alternatively, graphics controller 2075 can include therein a frame buffer for storing image data generated by CPU 2000 or the like.

I/O controller 2084 connects host controller 2082 with communication interface 2030, hard disk drive 2040, and DVD drive 2060 as relatively high-speed I/O units. Communication interface 2030 communicates with other apparatuses through a network. Hard disk drive 2040 stores programs and data used by CPU 2000 in computer 1900. DVD drive 2060 reads a program or data from DVD-ROM 2095 and provides the read program or data to hard disk drive 2040 through RAM 2020.

Also connected to I/O controller 2084 are relatively low-speed I/O units (i.e., ROM 2010, flexible disk drive 2050, and I/O chip 2070). ROM 2010 stores a boot program executed on startup of computer 1900 and/or programs depending on the hardware of computer 1900. Flexible disk drive 2050 reads a program or data from flexible disk 2090, and provides the program or data to hard disk drive 2040 through RAM 2020. I/O chip 2070 connects not only flexible disk drive 2050 to I/O controller 2084, but also various I/O devices to I/O controller 2084 through a parallel port, a serial port, a keyboard port, a mouse port, or the like.

A program provided to hard disk drive 2040 through RAM 2020 is provided by the user in a form of being stored on a recording medium, flexible disk 2090, DVD-ROM 2095, or an IC card. The program is read from the recording medium, installed in hard disk drive 2040 within computer 1900 through RAM 2020, and executed by CPU 2000.

A program is installed on computer 1900 to cause computer 1900 to function as series acquisition section 110, storage section 120, discretization section 130, fragmentation section 140, pattern extraction section 150, generation section 160, and classification section 170.

Information processes described in the program are read into computer 1900 to function as specific means implemented by software in corporation with the above-mentioned various hardware resources (i.e., as series acquisition section 110, storage section 120, discretization section 130, fragmentation section 140, pattern extraction section 150, generation section 160, and classification section 170). Then, information is computed or processed by the specific means depending on the intended use of computer 1900 in the embodiment to build a specific data processing apparatus 100 according to the intended use.

As an example, when computer 1900 communicates with an external device or the like, CPU 2000 executes a communication program loaded on RAM 2020 to instruct communication interface 2030 to perform communication processing based on the processing content described in the communication program. Under the control of CPU 2000, communication interface 2030 reads send data stored in a send buffer area or the like provided in a storage device, such as RAM 2020, hard disk drive 2040, flexible disk 2090, or DVD-ROM 2095, to send the data to a network, or writes receive data received from the network to a receive buffer area provided in the storage device. Thus, communication interface 2030 can transfer data exchanged with the storage device by the DMA (Direct Memory Access) method. Alternatively, CPU 2000 can read data from the storage device or communication interface 2030 as a source, and write the data to communication interface 2030 or the storage device as a destination to transfer the send/receive data.

Further, CPU 2000 reads, into RAM 2020, all or necessary parts from files or databases stored in an external storage device, such as hard disk drive 2040, DVD drive 2060 (DVD-ROM 2095), or flexible disk drive 2050 (flexible disk 2090), by means of DMA transfer or the like to perform various processing on the data on RAM 2020. Then, CPU 2000 saves the processed data back to the external storage device by means of DMA transfer or the like. In such processing, RAM 2020 can be considered to temporarily holding the content of the external storage device. Therefore, RAM 2020, the external storage device, and the like are collectively referred to as the memory, the storage section, the storage device, or the like. Various programs and various kinds of information, such as data, tables, and databases, in the embodiment are stored in such a storage device as targets of information processing. Note that CPU 2000 can also hold part of the content of RAM 2020 in a cache memory to perform reading and writing on the cache memory. Even in such a form, since the cache memory serves as part of the function of RAM 2020, the cache memory shall be included in RAM 2020, the memory, and/or the storage device in the embodiment unless otherwise denoted distinctively.

Further, CPU 2000 performs various processing on the data read from RAM 2020 as specified in a sequence of instructions of a program including various arithmetic operations, information processing, conditional determinations, and searching and replacing information described in the embodiment, and saves the processed data back to RAM 2020. For example, when a conditional determination is made, CPU 2000 compares any of various variables shown in the embodiment with any other variable or constant to determine whether it meets a condition, such as larger, smaller, not less than, not more than, or equal to, and when the condition is satisfied (or unsatisfied), the procedure branches to a different sequence of instructions or calls a subroutine.

Further, CPU 2000 can retrieve information stored in a file or a database in the storage device. For example, when two or more entries are stored in the storage device in such a manner to associate the attribute value of a second attribute with the attribute value of a first attribute, CPU 2000 searches the two or more entries stored in the storage device for an entry with the attribute value of the first attribute matching with a specified condition to read the attribute value of the second attribute stored in the entry so that the attribute value of the second attribute associated with the first attribute that meets the predetermined condition can be obtained.

The above-mentioned programs or modules can be stored on an external recording medium. As the recording medium, an optical recording medium, such as DVD, Blu-ray(registered trademark), or CD, a magnetooptical recording medium such as MO, a tape medium, or a semiconductor memory such as an IC card can be used in addition to flexible disk 2090 and DVD-ROM 2095. Further, a storage device such as a hard disk or a RAM provided in a server system connected to a private communication network or the Internet can also be used as a recording medium to provide a program to computer 1900 through the network.

While the present invention has been described with reference to the embodiment, the technical scope of the present invention is not limited to the description of the aforementioned embodiment. It will be obvious to those skilled in the art that various changes and modifications can be added to the aforementioned embodiment. From the appended claims, it will also be obvious that forms to which such changes or modifications are added shall be included in the technical scope of the present invention.

The execution sequence of processes, such as operations, procedures, steps, and stages in the apparatus, system, program, and method described in the appended claims and the specification, and shown in the accompanying drawings are not particularly specified as "ahead of," "prior to," or the like. It should be noted that the operations and the like can be carried out in any order unless output of the previous process is used in the subsequent process. Even when the description is made using "first," "next," and the like in the appended claims, the specification, and the operation flows in the drawings for convenience sake, it does not mean that it is imperative to carry out the operations and the like in this order.

What is claimed is:

1. A data processing method comprising:
    acquiring a learning data series for learning user operation of a touch panel display, wherein continuous-valued data including at least one-dimensional continuous values are arranged in plural pieces of learning data in the learning data series, wherein a classification result is added to each of the plural pieces of learning data in the learning data series;
    discretizing the learning data series to generate a second learning data series of discrete-valued data;
    acquiring the second learning data series in which the plural pieces of learning data are arranged according to a plurality of events;
    fragmenting the second learning data series of discrete-valued data to obtain a plurality of partial learning data series;
    estimating whether an abnormal event occurs in each of the plurality of partial learning data series;
    generating a learning classification result of each of the plurality of partial learning data series based on respective classification results added to the learning data series;
    learning respective classifications of the plurality of partial learning data series based on respective feature vectors for respective partial learning data series of the plurality of partial learning data series and respective learning classification results;
        wherein when a classification result indicating a level of an abnormality higher than or equal to a predetermined reference level is added to each data included in each of the plurality of partial learning data series, the method associates the classification result indicating the abnormality to the partial learning data series;
    obtaining, in response to learning respective classifications, user input to the touch panel display, wherein the user input comprises user operation of the touch panel display;
    converting the user input into a data series comprising numeric values representing the user operation of the touch panel display;
    wherein the data series comprises:
        a plurality of respective sets of coordinates at which a user touches the touch panel display while moving;
        a distance the user travels on the touch panel display while moving;
        a first time the user touches the touch panel display while moving;
        a second time after moving and until the user separates from the touch panel display; and
        a third time during which no operation is performed on the touch panel display;
    acquiring the data series in which plural pieces of data are arranged;
    fragmenting the data series to obtain a plurality of partial data series, wherein respective partial data series comprise a reference interval of time comprising 10 seconds ending at each respective piece of data of the plural pieces of data, and wherein at least one respective partial data series of the plurality of partial data series overlaps with at least one other partial data series of the plurality of partial data series;
    extracting a plurality of patterns of one or more pieces of data appearing in at least three of the plurality of partial data series;
        wherein the plurality of patterns comprise at least a first pattern, a second pattern, and a third pattern occurring consecutively in a respective partial data series, wherein the extracting a plurality of patterns further comprises extracting the first pattern, the second pattern, the third pattern, a fourth pattern comprising the first pattern and the second pattern, a fifth pattern comprising the first pattern and the third pattern, a sixth pattern comprising the second pattern and the third pattern, and a seventh pattern comprising the first pattern and the second pattern and the third pattern;

generating a feature vector having element values, which vary according to whether to include each of the plurality of patterns, for each of the plurality of partial data series, wherein generating the feature vector further comprises:

generating, for each of the plurality of partial data series, the feature vector having an element value indicative of the presence or absence of each of the plurality of patterns, wherein the element value comprises a 1 indicating a presence of a respective pattern in a respective partial data series, wherein the element value comprises a 0 indicating an absence of a respective pattern in a respective partial data series;

classifying each of the plurality of partial data series based on the feature vector and learning respective classifications;

estimating a state of the user based on the feature vector and learning respective classifications; and providing operating instructions to the user based on the feature vector, the estimated state of the user, and learning respective classifications.

\* \* \* \* \*